R. B. DAVY.
Method of Ventilation.
No. 216,083. Patented June 3, 1879.
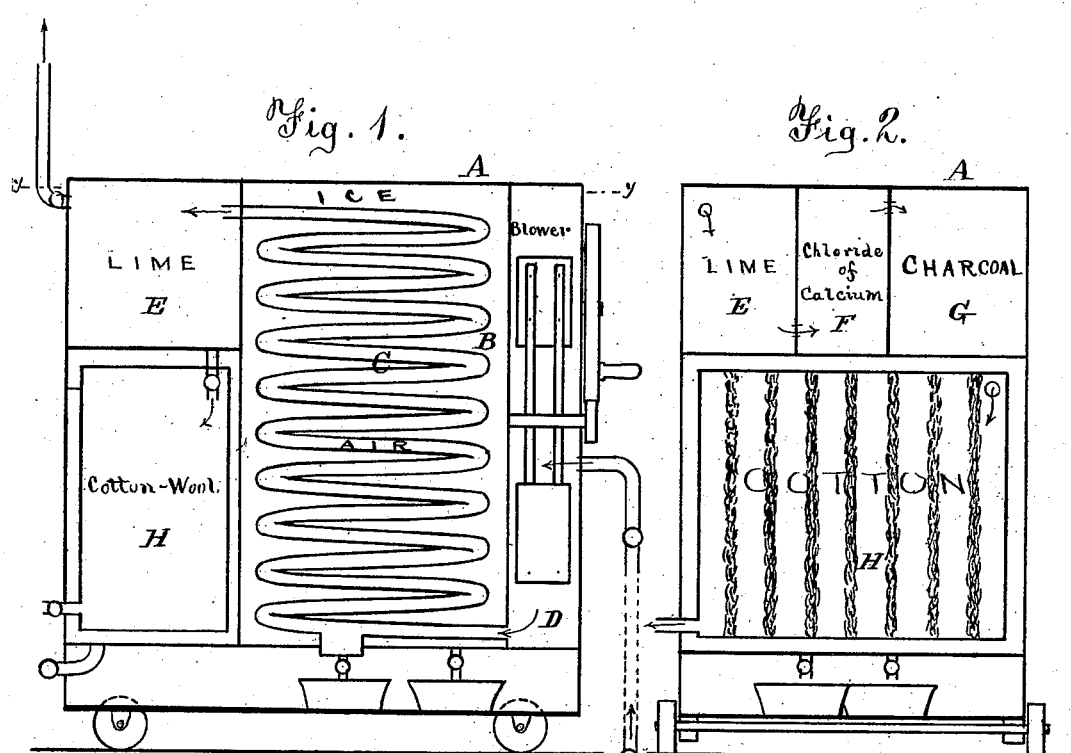
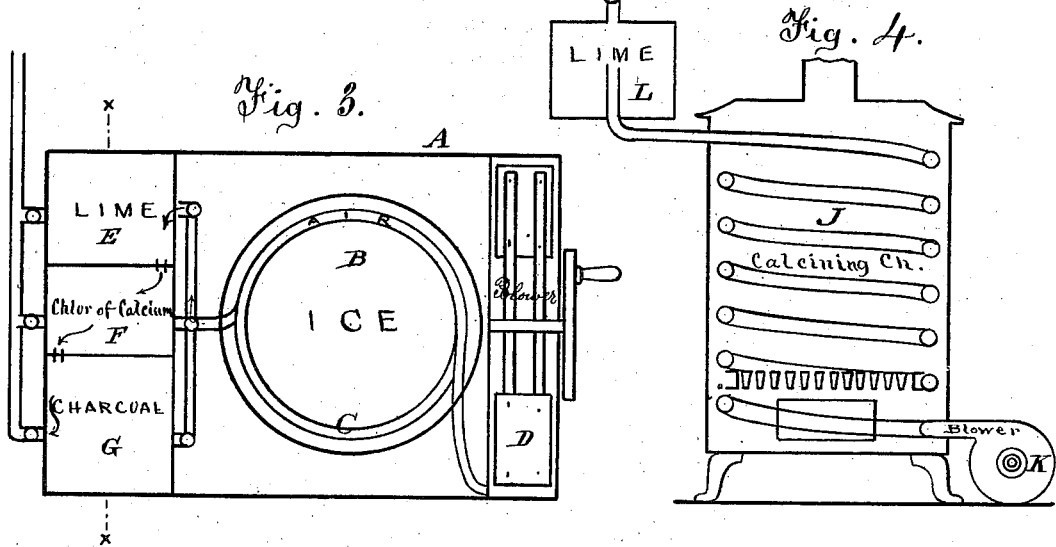
Attest.
Walter Knight.
Walter Allen
Inventor:
Robert B. Davy
By Knight Bros
Attys.

UNITED STATES PATENT OFFICE.

ROBERT B. DAVY, OF CINCINNATI, OHIO.

IMPROVEMENT IN METHODS OF VENTILATION.

Specification forming part of Letters Patent No. 216,083, dated June 3, 1879; application filed October 11, 1878.

*To all whom it may concern:*

Be it known that I, ROBERT B. DAVY, of Cincinnati, Hamilton county, Ohio, have invented a new and Improved Method of Ventilation, of which the following is a specification.

My invention relates to an improved method of and apparatus for ventilation in hospitals, halls, public buildings, boats, railroad-cars, &c., which comprises cooling the air in summer, heating it in winter, and purifying impure air by calcination, oxidation, and absorption.

It is known that the present systems of heating winter apartments are, in very many respects, faulty, furnishing, as they do, an insufficient quantity of pure air, and necessitating the frequent breathing of foul and vitiated air. Besides this, scientific researches have proved that there are always floating in the atmosphere an infinite number of small particles of dust and germs of organisms capable of producing disease when taken into the blood. That these germs develop and multiply much more readily in close warm rooms than they could in the cold external atmosphere is scarcely to be doubted. Being repeatedly breathed, they become lodged in the air-passages and find their way into the blood, to produce certain peculiar forms of disease well known to the medical profession.

The apparatus to be presently described not only consumes every particle of organic matter thrown off from the lungs and skin, (matter whose decomposition produces the heavy disagreeable odor so characteristic of close apartments,) but also destroys the vitality of every germ, and leaves the air purer than that externally.

In summer the apparatus is so modified as to produce cold instead of heat, so as to prevent the development and propagation of all those organisms capable only of existing in high temperatures, notably among which may be mentioned that of yellow fever.

Comfort and health, then, are the great desiderata to be supplied by this improvement.

In destroying the impurities by heat I resort to calcination, and accomplish the same by forcing the air, along with everything held in suspension, through metallic pipes, heated to dull redness, (1,000° Fahrenheit,) by means of a blower or fan-wheel.

The advantage in this process consists in the availability of vitiated air for future breathing by simply undergoing calcination.

Very much heat is lost along with the impure hot air which escapes, rendering it necessary to heat up the cold air coming in to take its place. All this may be avoided by the method of calcination, which is capable of purifying the atmosphere of an ordinary closed room almost indefinitely. The carbonic acid is disposed of by passage through an apartment containing lime. The process of refrigeration or cooling the summer air of buildings is accomplished by forcing the air, in like manner, by means of a fan-wheel or blower, through a metallic coil immersed in cool or cold water, or covered with ice or a freezing-mixture.

The carbonic acid and moisture are to be removed by passing the current through caustic lime, and, when not sufficiently desiccated, passing it also through a chamber containing chloride of calcium, and, finally, when desired, through other chambers containing charcoal and through cotton-wool, either one or both, until sufficiently purified.

In the accompanying drawings, Figure 1 is a vertical section of an apparatus such as I employ in my method of ventilation. Fig. 2 is a section on the line $x\,x$. Fig. 3 is a section on the line $y\,y$. Fig. 4 is a vertical section of a calcining-chamber such as employed in my method.

A represents a shell, case, or box, which may be of rectangular figure and of wood or other material. This box contains a refrigerating tank or chamber, B, of galvanized iron or other water-tight material. Said tank contains a coiled pipe, C, which receives air from a blower, D, and which discharges said air in a cooled condition into one or all of a series of compartments or chambers—to wit, a chamber, E, containing caustic lime, a chamber, F, containing chloride of calcium, a chamber, G, containing charcoal, and a chamber, H, containing diaphragms, *h*, of cotton-wool.

Suitable pipes and faucets are provided to enable the attendant to direct the current through any one or more of these chambers in any desired succession, and other faucets to enable the discharge of water of condensation.

For calcination I provide a stove, furnace, or hot-air drum, J, having a coil, through which air is driven by a blower, K, and which delivers into a chamber, L, containing lime, to take up the surplus moisture and the carbonic acid.

This pipe may, if desired, discharge into the cotton-wool chamber to rid it of any ashes or other mechanical impurities not destroyed by the heat.

The desired draft may be, if preferred, accomplished by suction devices at the delivery instead of blowers at the receiving passages.

I claim as new and of my invention—

1. The method or process of ventilation consisting of driving the breathing-air through a pipe or coil subjected to a calcining or a refrigerating temperature, or each in succession, and thence through lime.

2. The method of ventilation consisting of causing the entering air to pass in succession through a refrigerating-chamber, and thence through one or all of other chambers, which respectively contain chloride of calcium, charcoal, and cotton-wool.

3. The ventilating apparatus consisting of blower D, coil C, refrigerating-chamber B, and additional chambers E F G H, containing lime, chloride of calcium, charcoal, and cotton-wool, the whole being connected by suitable faucets, substantially as set forth.

In testimony of which invention I hereunto set my hand.

ROBERT B. DAVY.

Attest:
   JNO. H. KNIGHT,
   W. TYSON JUDKINS.